United States Patent [19]

Betz

[11] Patent Number: 4,662,473

[45] Date of Patent: May 5, 1987

[54] VIBRATORY SEISMIC SOURCE FOR GENERATING COMBINED COMPRESSIONAL AND SHEAR WAVES

[75] Inventor: Robert M. Betz, Dallas, Tex.

[73] Assignee: Atlantic Richfield Company, Los Angeles, Calif.

[21] Appl. No.: 818,199

[22] Filed: Jan. 13, 1986

[51] Int. Cl.$^4$ .............................................. G01V 1/04
[52] U.S. Cl. .................... 181/113; 181/114; 181/119; 181/401; 367/189
[58] Field of Search ............... 181/113, 114, 119, 121, 181/140, 142, 401; 367/75, 143, 189, 190; 73/663, 665; 124/56; 404/133; 173/39, 42–44, 114, 116, 117, 128, 132, 133, 134

[56] References Cited

U.S. PATENT DOCUMENTS

| | | | |
|---|---|---|---|
| 3,159,232 | 12/1964 | Fair ................................ | 181/114 X |
| 3,159,233 | 12/1964 | Clynch et al. ...................... | 181/119 |
| 3,277,977 | 10/1966 | Silverman ........................ | 181/114 X |
| 3,282,372 | 11/1966 | Brown et al. ..................... | 181/121 X |
| 4,059,820 | 11/1977 | Turpening ........................ | 181/113 X |
| 4,143,736 | 3/1979 | Fair ................................. | 181/119 |
| 4,291,780 | 9/1981 | Fulkerson ........................ | 181/114 X |
| 4,321,981 | 3/1982 | Waters ............................. | 181/114 X |
| 4,354,572 | 10/1982 | Martin ............................. | 181/401 X |
| 4,446,742 | 5/1984 | Thompson, Jr. et al. ...... | 181/121 X |
| 4,537,077 | 8/1985 | Clark et al. ..................... | 367/190 X |
| 4,564,083 | 1/1986 | Layotte et al. ................. | 181/121 X |

FOREIGN PATENT DOCUMENTS 155667 9/1985 European Pat. Off. ............ 181/114

Primary Examiner—Deborah L. Kyle
Assistant Examiner—John E. Griffith
Attorney, Agent, or Firm—Robert M. Betz

[57] ABSTRACT

A vibratory seismic surface source includes a single vibrating mass, the energy of which is coupled with the earth through a ground contacting base plate. The vibrating mass is connected to the base plate by means of a ball and socket joint which constitutes a universal pivot for the vibratory axis of the mass. Thus, this vibratory axis may be made to assume any vector path with respect to a seismic line. In this manner, any desired combination of compressional and shear waves, both SH and V type, may be generated and recorded simultaneously at a point on the earth's surface remote from the source.

3 Claims, 6 Drawing Figures

VIBRATORY SEISMIC SOURCE FOR GENERATING COMBINED COMPRESSIONAL AND SHEAR WAVES

BACKGROUND OF THE INVENTION

1. Field of the Invention

This invention relates generally to the field of seismic exploration and more particularly to an improved apparatus for imparting vibrational energy to the earth wherein selected combinations of compressional and shear wave energy can be generated simulataneously.

2. Description of the Prior Art

Simultaneous generation of compressional and shear seismic waves utilizing vibrating masses is taught by K. H. Waters in U.S. Pat. No. 4,321,981 entitled "Combination Shear Wave and Compressional Wave Seismic Energy Vibrator" issued on Mar. 30, 1982. Waters employs two or more vibrators whose vibrational axes are oriented along opposing non-vertical paths. The patented apparatus produces selectively proportioned simultaneous compressional and shear waves by controlling the relative phases of the two vibrating masses with respect to their axial positions at any moment. A limitation of the patented Waters apparatus is its inability to generate and record shear waves of both SH and SV type in a single operation. To record both such types of shear waves Waters first positions the base plate through which energy is coupled to the earth together with the vibrators themselves so that the vibrational axes are aligned transversely to the line of seismic survey extending between the vibrators and remotely positioned geophones. This enables recordation of P waves and SH type shear waves only. After operating the vibrators the base plate must be repositioned for a second operation so that the vibrational axes are aligned in the direction of the line of survey, thereby enabling recordation of P waves and SV type shear waves. Since information concerning both SH and SV type shear waves is desirable in order to obtain maximum information about sub-surface rock properties, it is advantageous to be able to measure and record both types of shear waves simultaneously, rather than sequentially.

A method and apparatus which provides simultaneous compressional and shear waves of both SH and SV type utilizing but a single vibrating mass is taught in commonly assigned U.S. patent application Ser. No. 792,531 filed Oct. 29, 1985 in the name of Tom Airhart and entitled "Full Wave Field Vibratory Seismic Source". The apparatus described in the subject patent application couples a vibrating mass to a ground engaging base plate so as to enable pivotal rotation of the vibrating mass about two mutually perpendicular rotational axes. In this way the vibratory axis of the vibrating mass may be made to coincide with any preselected vector path. This vector path can then be oriented with respect to a remotely located three element orthogonal geophone so as to enable simultaneous generation and detection of compressional and shear SH and SV waves. The relative amplitudes of such waves are varied by selecting any desired combination of tilt and azimuth for the vibratory axis. The vibrating mass is linked to the base plate through two separately rotatable shafts. In order to avoid attenuation or distortion of the resultant signal, the mechanical linkage through such shafts must be substantially free of misalignment and built to close tolerances.

SUMMARY OF THE INVENTION

The present invention proposes apparatus for imparting vibrational energy to the earth utilizing a single vibrating means which is coupled to an earth engaging base plate for operation along any desired vector path without altering the position of such base plate. Coupling is accomplished directly between the vibrating means and the base plate without the intervention of any separately moveable intermediate member or element. In a preferred embodiment the vibratory means comprises a double rod end piston which reciprocates relative to the motion of a reaction mass slidably mounted on such piston. A ball fixed to the lower rod end is housed within a socket embedded in or otherwise fixed to the surface of the base plate. The ball is free to turn in any direction within the socket when the vibratory axis of the vibrating means is varied. However, the ball remains captured within the socket so that the base plate must follow both upward and downward movement of the vibrating means.

In its broadest aspect the invention comprises any suitable means for supporting and applying a force or forces against the upper rod end in order to vary the tilt and azimuth of the vibrating axis so that its direction coincides with the desired vector path. In a narrower aspect the upper rod end may extend through a radial slot in a rotatable turntable horizontally mounted above the base plate such as on a transport vehicle. Means such as a hydraulic cylinder are adjustably secured between the turntable and the upper rod end for urging such end radially along the slot. This causes the vibrating means to pivot on its lower ball end in a vertical plane. Further means such as a motor driven chain drive are provided for rotating the turntable so as to change the angular orientation of the radial slot carrying with it the upper rod end of the vibrating means, thus causing further pivotal movement of such means about a vertical axis. The combination of these two motions aligns the vibratory axis with any desired vector path.

It is therefore a general object of the present invention to provide a vibratory seismic source capable of generating simultaneous compressional and shear waves.

It is a further object of this invention to provide such apparatus wherein the resultant vibrational energy may be coupled to the earth along any selected vector path with a minimum of distortion or attenuation.

It is a still further object of the present invention to provide such apparatus wherein the vibrating mass is coupled to the earth in a manner which is compatible with a variety of means for adjusting the vibratory axis.

Other objects and advantages of this invention will become apparent from a consideration of the following detailed description taken in conjunction with the accompanying drawings.

DETAIL DESCRIPTION OF THE PREFERRED EMBODIMENTS

Figure 1:
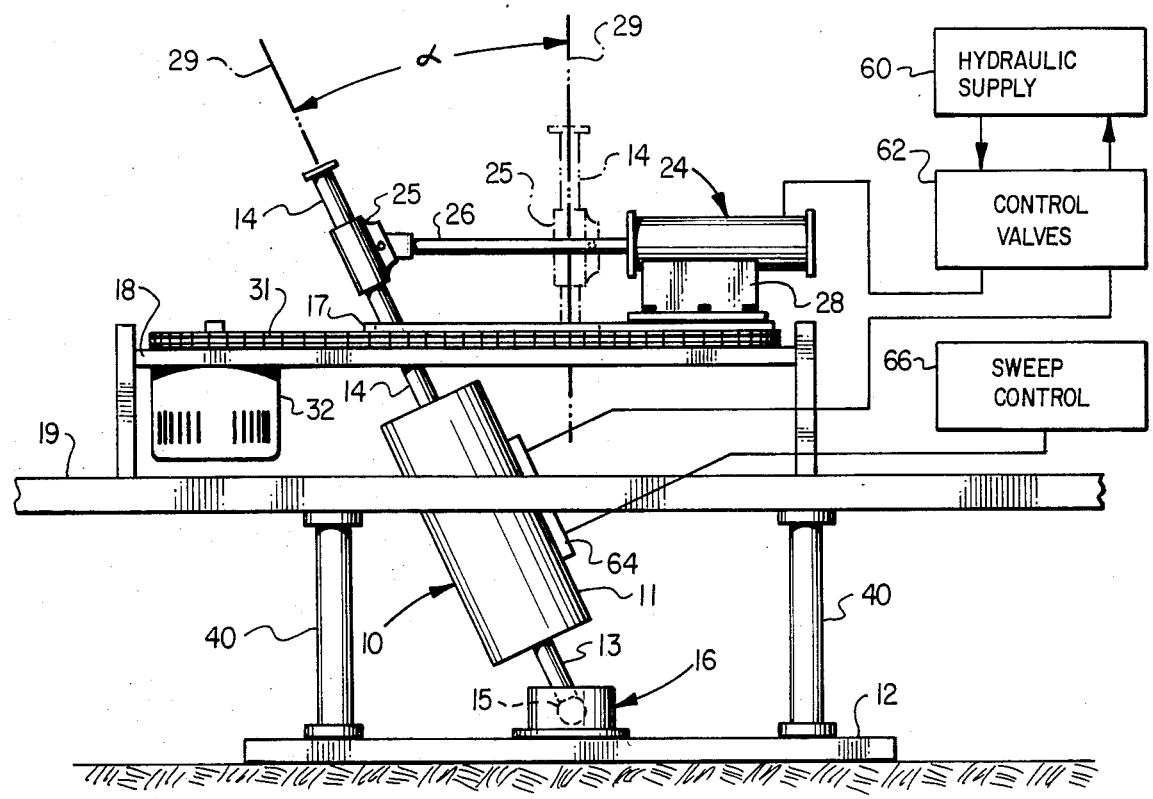
FIG. 1 is a simplified elevational view of a seismic vibrator apparatus in accordance with the preferred embodiment of this invention with associated equipment shown in block form.

Referring now to FIG. 1, an apparatus is shown for practicing the invention utilizing a single vibrating mass. Cylindrical vibrator assembly 10 may be of the type utilizing a reaction mass mounted for reciprocal motion on a double rod end piston under hydraulic control, all as well known to the art. An example of such a device is fully described and shown in U.S. Pat. No. 3,159,233 in the name of F. Clynch et al, filed on Dec. 1, 1964. Thus, reaction mass 11 is slidably mounted on a double rod end piston (not shown) having outwardly projecting rod ends 13 and 14. Mass 11 is hydraulically reciprocated through a short stroke at varying frequencies. As the mass 11 moves the corresponding opposite movements of the piston are coupled to base plate 12 thus transferring seismic vibrations into the earth. The manner of attachment of the vibrating means 10 to the base plate 12 and the means for adjustment of the vibratory axis of the vibrating means 10 will be more particularly described below.

A ball fixed to lower rod end 13 is recessed within socket 16 which is embedded in or otherwise secured to the surface of base plate 12. Ball 15 is rotatable in any direction about its center and therefore constitutes a "universal" pivot for vibration assembly 10.

Figure 2:
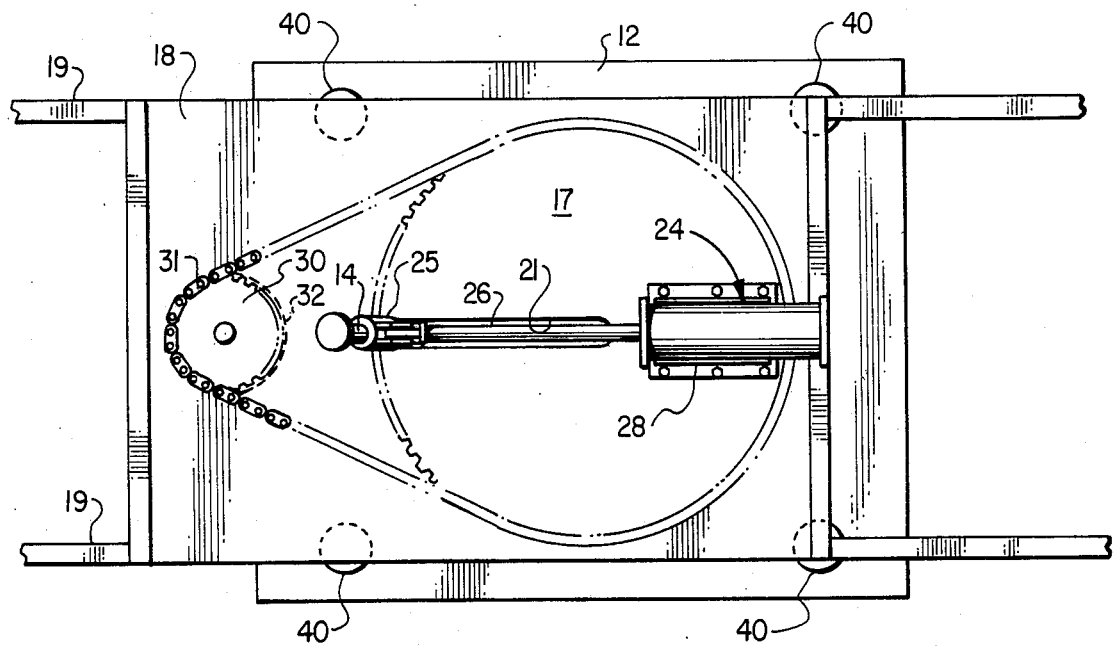
FIG. 2 is a top plan view of the vibrator apparatus shown in FIG. 1.

With additional reference to FIG. 2, adjustment of the vector path of vibrator assembly 10 is preferably accomplished with the aid of turntable 17 mounted horizontally on raised bed 18 carried upon frame 19 of any suitable transport vehicle (not shown). Turntable 17 is provided with a radial slot 21 through which the upper rod end 14 of assembly 10 extends in slidable relation. Hydraulic cylinder 24 is mounted on turntable 17 by means of a bracket 28 so that its piston rod 26 is aligned with slot 21, the external end of rod 26 being pivotally interconnected with a cylindrical sleeve 25 surrounding upper rod end 14. Movement of piston rod 26 slides upper rod end 14 along slot 21, thereby causing vibrational axis 29 of assembly 10 to pivot about ball 15 so that axis 29 assumes any desired angle α with respect to a vertical position.

Figure 3:
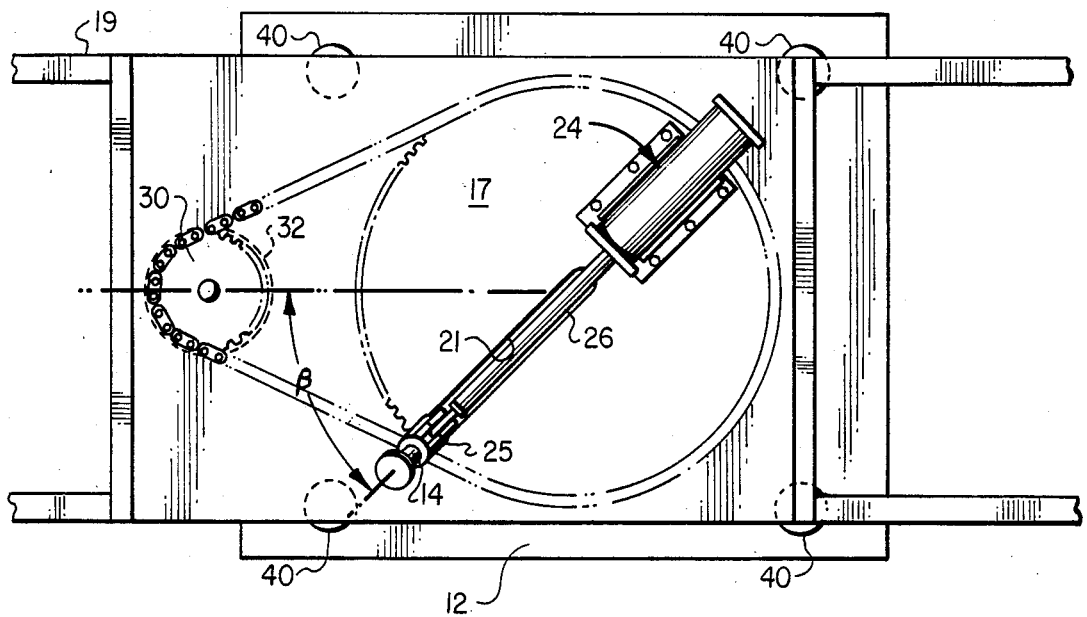
FIG. 3 is a further top plan view of the vibrator apparatus in FIG. 1 with a rotated position of the turntable.

Rotation of turntable 17 is provided through drive gear 30 and chain drive 31 operated by reversible motor 32 situated beneath bed 18. Suitable means are provided such as a dependent flange (not shown) for rotatably anchoring turntable 17 to bed 18. As best seen with reference to FIG. 3 turntable slot 21 can in this manner be rotated through any desired angle β so that slot 21 assumes any desired azimuthal position. This in turn causes a corresponding rotation of the vibrational axis 29 of assembly 10 accompanied by corresponding pivotal movement about ball 15.

The above-described angular adjustments through angles α and β may be performed sequentially or simultaneously. If desired such steps may be accomplished automatically through control means well known to the art.

Figure 4:
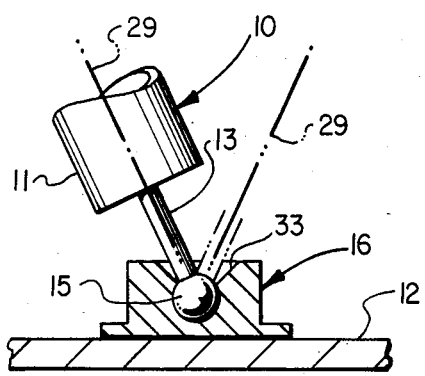
FIG. 4 is a detailed cutaway view of the ball and socket coupling means utilized with the vibrator apparatus of this invention.

With particular reference to FIG. 4 it is noted that socket 16 is provided with an upwardly opening inverted cone-shaped aperture 33 which subtends a solid angle sufficient to accommodate any desired pivotal movement of vibrational axis 29 of vibrator assembly 10. The circumference of ball 15 is larger than the diameter of aperture 33 at its lower end. Thus ball 15 is securely captured within socket 16 and faithfully transmits to base plate 12 the vibratory motion of assembly 10 in both up and down directions. An advantage of this design is that vibrator assembly 10 may be tilted in any direction from the vertical directly to a desired vector path or alternatively this path may be arrived at by rotation about two different axes. Thus the coupling provided by ball 15 and socket 16 is compatible with a variety of means for application of the necessary forces to effect adjustment of the vibrational axis 29. Regardless of the means selected for such adjustment, since no intermediate movable element separates vibrator assembly 10 and base plate 12, any possible mechanical misalignment resulting from the use of such element is avoided. This lessens or eliminates one source of possible attenuation or distortion of the seismic signal to be generated. It should be emphasized that ball 15 may be either a complete sphere or of other shape provided the surface thereof interfacing with socket 16 is itself substantially shperical. Suitable bearing means whether liquid or solid may be applied between such interfacing surfaces to insure ease of adjustment of the position of assembly 10.

In order to apply an appropriate static load to base plate 12 and to avoid lateral shifting thereof in response to non-vertical forces imposed by vibrator assembly 10, base plate 12 is interconnected with vehicle frame 19 by means of adjustable hydraulic support members 40. By extending support members 40 one can shift the weight of the transport vehicle entirely or in part from its spring suspension and its tires so as to bear directly upon and stabilize base plate 12.

Figure 5:
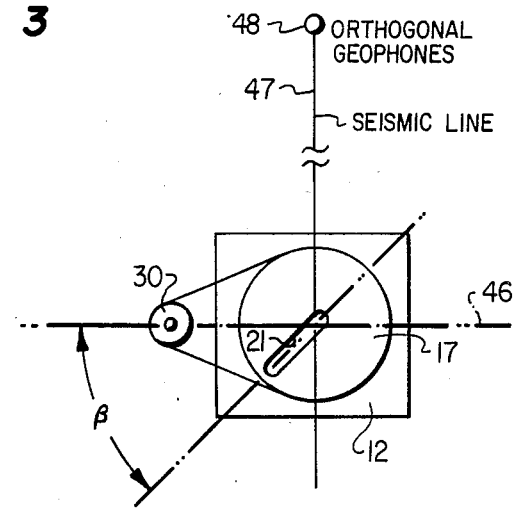
FIG. 5 is a schematic plan view of the apparatus of this invention illustrating its orientation with respect to a seismic line.
Figure 6:
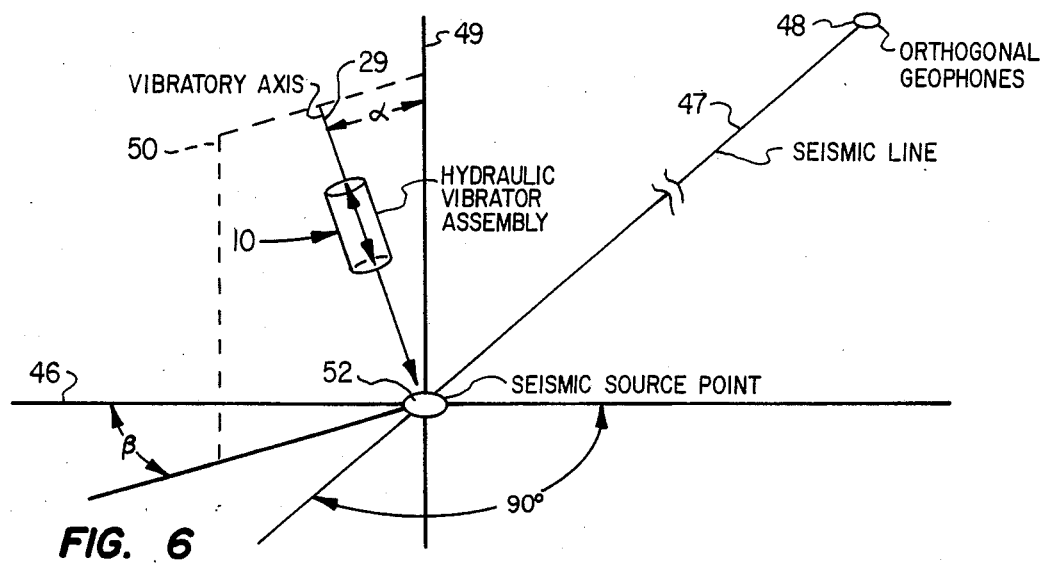
FIG. 6 is a schematic representation of a typical mode of deployment of the vibrator apparatus of this invention illustrating the vector path of the apparatus in relation to the seismic line of FIG. 5.

In operation one determines the desired vector path for assembly 10 with repsect to a seismic line. As an illustration, as shown in FIG. 5 one can align the transport vehicle so that it extends along a perpendicular 46 to seismic line 47 terminating in remote three-element orthogonal geophone 48. In this way rotation of slot 21 through any angle can establish the desired angular relation to line 47. As seen in the example of FIG. 6 vibratory axis 29 of assembly 10 lies at angle α to the vertical direction 49 so that the vector path of assembly 10 falls within vertical plane 50. Since plane 50 is at an acute angle β with regard to seismic line 47, vibratory motion of assembly 10 will inject energy into the earth at seismic source point 52 which has components of P, SH and SV waves which may be sensed by the respective elements of orthogonal geophone 48. It is clear that the relative amplitudes of these waves may be adjusted as desired by controlling the values of angles α and β. As shown in the dotted outline of upper rod end 14 of assembly 10 of FIG. 1 one can if desired place the vibratory axis 29 of assembly 10 in a vertical position so as to operate the apparatus as a pure P-wave vibrator.

If the angle α is limited to near vertical, i.e.; 5 degrees to not more than 25 degrees from vertical, the amplitude of the resultant shear wave energy for some near surface ground conditions is believed to retain the maximum value which can be achieved with a device of the character of assembly 10. The increased compression of the ground resulting from such near vertical stress increases shear stiffness and strength in the ground where those properties are deficient. If, in use, the frictional coupling between base plate 12 and the earth is broken by continued reciprocal motion of assembly 10, the underside of base plate 12 may be provided with inverted pyramidal cleats (not shown). Such coupling devices are well known as described, for example, in U.S. Pat. No. 3,159,232 issued to D. W. Fair on Dec. 1, 1964.

Frequency and sweep wave control of the apparatus of this invention may be accomplished in a manner well known to those skilled in this art utilizing hydraulic supply 60 and control valves 62. Servo valves 64 may then be operated by signals from sweep control 66 so as to provide reciprocation of the internal reaction mass within assembly 10 and produce corresponding vibrational motion of base plate 12 for coupling into the earth.

It should be understood that the particular form of vibrator described in this application as well as the means for adjustment of the vibratory axis 29 of vibrator assembly 10 are illustrative only and not to be regarded in any sense as limiting the scope of the apparatus of this invention as more particularly set forth in the appended claims.

What is claimed is:

1. Apparatus for generating vibratory seismic singals in the earth comprising:
   (a) vibration means having an upper and a lower end and being adapted for producing reciprocal vibrations along a vibratory axis extending between said upper and lower ends;
   (b) base plate means for coupling the energy of said vibrations into the earth;
   (c) an upwardly opening socket member mounted on the top of said base plate means;
   (d) a ball member fixed to said lower end of said vibration means, said ball member being rotatably secured within said socket member so that said vibratory means may be pivoted in any direction about said lower end;
   (e) a rotatable turntable;
   (f) means for supporting said turntable above said base plate means in spaced coplanar relation thereto, said turntable being provided with a radially extending slot through which said upper end of said vibration means extends in slidable relation thereto;
   (g) means adjustable secured between said turntable and said upper end of said vibration means for urging said upper end radially within said slot so as to vary the angle of said vibratory axis in relation to the vertical; and
   (h) means for rotating said turntable so as to vary the aximuthal direction of said slot and of said vibratory axis.

2. Apparatus as claimed in claim 1 wherein said means for urging said upper end of said vibration means radially within said slot is a hydraulic cylinder mounted on said turntable so that the piston rod of said cylinder extends in alignment with said slot and is operatively interconnected with said upper end.

3. Apparatus as claimed in claim 1 wherein said turntable is carried upon a transport vehicle, and further including lift means adjustably secured between said transport vehicle and said base plate means for transferring the weight of said transport vehicle at least in part to said base plate means.

* * * * *